United States Patent [19]

Villiger

[11] Patent Number: 4,762,428
[45] Date of Patent: Aug. 9, 1988

[54] TEMPERATURE SENSOR FOR A DRYER ACCESSORY ON A WEIGHING DEVICE

[75] Inventor: Robert Villiger, Embrach, Switzerland

[73] Assignee: Mettler Instrumente AG, Greifensee, Switzerland

[21] Appl. No.: 857,364

[22] Filed: Apr. 30, 1986

[30] Foreign Application Priority Data

May 10, 1985 [CH] Switzerland .................. 1991/85

[51] Int. Cl.⁴ .................................................. G01K 1/14
[52] U.S. Cl. ..................................... 374/149; 374/14; 374/208; 219/358
[58] Field of Search ............... 73/76; 177/245, 264; 374/14, 149, 158, 132, 183–185, 208–210; 338/28–30, 229; 136/230, 232, 233; 34/39, 46; 29/862, 871, 882; 439/442, 887–882; 219/358; 236/DIG. 6, DIG. 12

[56] References Cited

U.S. PATENT DOCUMENTS

| | | | |
|---|---|---|---|
| Re. 25,847 | 8/1965 | Forney, Jr. ............... | 29/862 |
| 2,658,984 | 11/1953 | Mohn ....................... | 34/39 |
| 2,676,489 | 4/1954 | Basham .................... | 374/136 |
| 2,709,914 | 6/1955 | Brabender et al. ...... | 73/76 |
| 2,929,968 | 3/1960 | Henisch ................... | 340/598 |
| 3,015,234 | 1/1962 | Springfield .............. | 374/208 |
| 3,032,132 | 5/1962 | Ohaus ...................... | 73/76 |
| 3,183,705 | 5/1965 | Welkowitz ............... | 374/178 |
| 3,463,000 | 8/1969 | Broadwin ................. | 73/76 |
| 3,811,958 | 5/1974 | Maurer .................... | 136/235 |
| 3,904,364 | 9/1975 | Dodson .................... | 374/14 |
| 3,939,012 | 2/1976 | Williams .................. | 136/230 |
| 4,028,139 | 6/1977 | Smith et al. .............. | 136/230 |
| 4,039,778 | 8/1977 | Williams .................. | 136/233 |
| 4,060,094 | 11/1977 | McAinsh .................. | 136/230 |
| 4,165,633 | 8/1979 | Raisanen .................. | 73/76 |
| 4,316,384 | 2/1982 | Pommer et al. ......... | 73/76 |

FOREIGN PATENT DOCUMENTS

| | | |
|---|---|---|
| 0017581 | 10/1980 | European Pat. Off. . |
| 2647119 | 6/1977 | Fed. Rep. of Germany ...... 136/233 |
| 2921614 | 3/1980 | Fed. Rep. of Germany . |
| 82747 | 5/1982 | Japan ...................... 73/76 |
| 526771 | 8/1972 | Switzerland . |

OTHER PUBLICATIONS

W. R. Blevin and Jon Geist, "Influence of Black Coatings on Pyroelectric Detectors", *Applied Optics*, vol. 13, No. 5, May 1974, pp. 1171–1178.

*Primary Examiner*—William A. Cuchlinshi, Jr.
*Assistant Examiner*—W. Morris Worth
*Attorney, Agent, or Firm*—Holman & Stern

[57] ABSTRACT

A temperature sensor includes an elongated support of a material having good thermal conductivity. The temperature sensor element is pressed against the support by a spring element, in order to measure the temperature of the support. A mean temperature value can be determined, as a result of the substantial length of the support and the particular horizontal disposition thereof with respect to the heating element.

2 Claims, 2 Drawing Sheets

TEMPERATURE SENSOR FOR A DRYER ACCESSORY ON A WEIGHING DEVICE

BACKGROUND OF INVENTION

The subject of the invention is a temperature sensor for a dryer accessory on a weighing device, and the disposition of the temperature sensor in the dryer accessory of the weighing device.

A temperature sensor for regulating the irradiation temperature of an infrared heating means is known from Ger. OS No. 26 47 119, and includes two wires or strips of different metal alloys, which wires or strips are welded together on one of their respective ends and are inserted in a protective tube of quartz material. The weld region of the wires or strips contacts the inner wall of the tube.

Quartz protective tubes have the disadvantage in that they are very fragile, and also they present a large thermal inertia due to their low thermal conductivity.

SUMMARY OF THE INVENTION

Accordingly, an object of the present invention is to eliminate the aforesaid disadvantages of the known temperature sensors. Another object is to advantageously dispose the temperature sensor in a dryer accessory of a weighing device.

The temperature sensor element is held protected against a thermally conducting support, which enables the measurement of the mean temperature at the mounting location, basically independently of any locally higher irradiation densities from the heating element.

The temperature sensor element can be held fixed against the support by the compressive force of a spring. This holding occurs successfully even when the support and the temperature sensor element expand and shift in varying degrees in comparison to each other due to the different expansion properties of the respective materials of which they are comprised. In one embodiment, the spring is a part of the support, which makes possible economical manufacturing.

If the temperature sensor element is inserted in a metal tube, the spring can be slid into the tube in simple fashion so as to hold the temperature sensor element fixed in place. If an opening is provided in the tube, the spring can be positioned exactly against the temperature sensor element and hooked onto the opening.

The tube parts which are compressed together prevent the temperature sensor element from slipping out of place in the support due to thermal expansion or vibrations, and at the same time they provide a means of absorbing tension in the connecting wires. The high thermal conductivity of the support material promotes rapid equalization of differing temperatures within the space over the pan of the weighing device.

BRIEF DESCRIPTION OF THE DRAWINGS

In the following exemplary embodiments of temperature sensors according to the present invention are described with reference to the drawings.

DETAILED DESCRIPTION OF THE INVENTION

Figure 1:
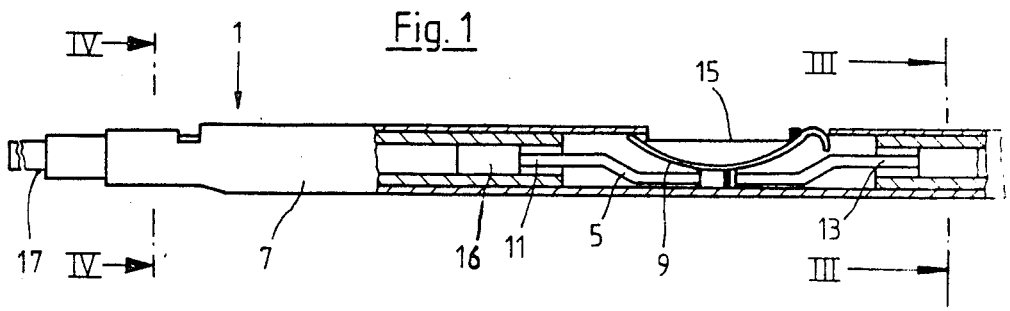
FIG. 1 is a side cross sectional view, partly in section, of a temperature sensor according to the present invention.

In the illustration of the embodiment of a temperature sensor 1 according to FIG. 1, a temperature sensor element 5, which is comprised, e.g., of a temperature-sensitive diode, a silicon semiconducting resistance, a thermocouple element, an NCT (negative coefficient of temperature) resistance, or a PCT (positive coefficient of temperature) resistance, which element 5 is inserted in a tubular support 7 and is pressed strongly against the wall of support 7 by means of a spring 9. Two connecting wires 11 and 13 of the temperature sensor element 5 are embedded in insulating materials, 37, 37, preferably by compression, along with a contact element 16 and a stranded conductor 17, and pass out of both ends of the support 7, where they can be directly electrically connected to a controlling or switching device.

Figure 3:
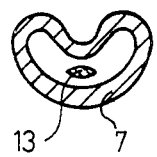
FIG. 3 is a cross-sectional view taken along line III—III of FIG. 1.

The spring 9 which presses the temperature sensor element 5 against the support 7 has a curved shape, and is inserted into the support 7 through a slot-shaped opening 15. At the location at which the respective connecting wires 11 and 13 are introduced into the insulating material 37, the tube-shaped support 7 is compressed into a kidney-shaped cross section as shown in FIG. 3. Both the spring 9 and the compression of the support 7 at this location (indicated in FIG. 3) ensure that the temperature sensor element 5 is pressed strongly against the walls of the support 7 at all temperatures, so that the sensor element 5 can exactly sense the temperature of the support 7.

Figure 4:
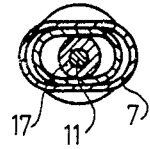
FIG. 4 is a cross-sectional view taken along line IV—IV of FIG. 1.

At the end of the support 7, at the location indicated by line IV—IV of FIG. 1, the support is flattened as seen in FIG. 4, in order to prevent its rotation after being inserted into an appropriate holding device not shown at the location of use.

Figure 2:
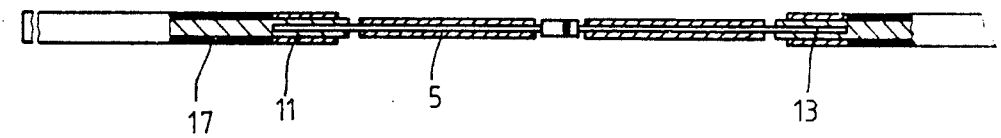
FIG. 2 is a top cross-section view of a temperature sensor element installed in the temperature sensor according to FIG. 1.

In FIG. 2, the temperature sensor element 5 is shown without the support 7. The connecting wires 11 and 13 are only a few centimeters long, e.g. 1.5 to 2.0 cm, and their ends are welded to the stranded conductors 17. The conductors and sensor element 5, as assembled, are then pushed into the support 7.

Figure 5:
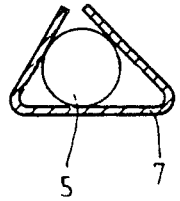
FIG. 5 is a cross-sectional view through a support including a bent-around sheet.
Figure 7:
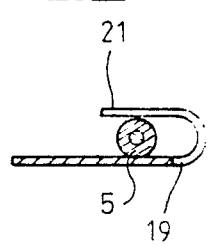
FIG. 7 is a cross-sectional view taken along line VII—VII of FIG. 6.
Figure 6:
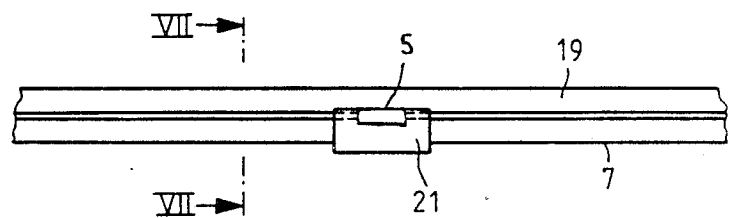
FIG. 6 is a top cross-sectional view of a strip-shaped support.

In place of a support 7 with a circular cross section, a polygonal or oval support may be employed. Also, a support can be used composed of a sheet 19 which is folded over in the region of the temperature sensor element 5, wherewith the folded-over section 21 of the support 7 may be elastically clamped in place (FIGS. 5, 6, and 7).

Figure 8:
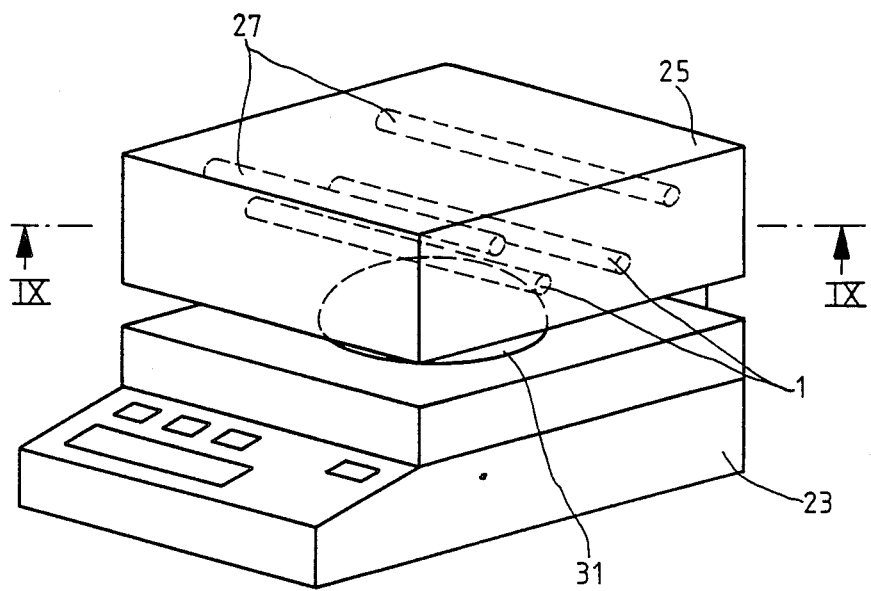
FIG. 8 is a perspective view of a weighing device with a dryer accessory.
Figure 9:
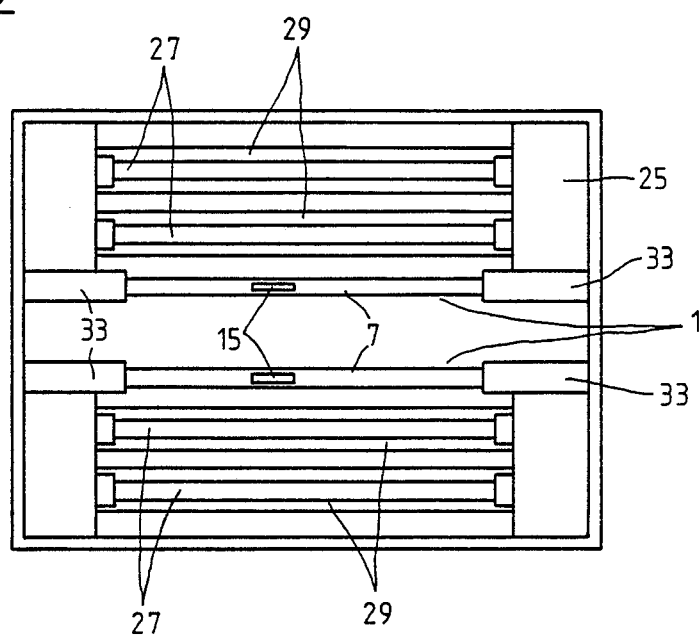
FIG. 9 is a bottom view of the dryer accessory taken along line IX—IX of FIG. 8.

Each of FIGS. 8 and 9 shows two temperature sensors installed in a dryer accessory 25, disposed above a weighing device 23. The two temperature sensors 1 and the four infrared heating elements 27 are shown only schematically in dotted outline in FIG. 8, for the purpose of promoting better understanding of the view of FIG. 8, and of FIG. 9.

The infrared heating elements 27 are comprised of heating wires, disposed in pairs under a preferably gold-plated concave reflector 29. The two tubular supports 7 with the temperature sensor elements 5 are disposed staggered with respect to the infrared heating elements 27 which are disposed above the weighing pan 31, and the said supports 7 and sensor elements 5 are disposed below the heating elements 27. The ends of the supports 7 are inserted in contact sockets 33 comprised of plastic or ceramic material, which sockets are affixed to the dryer accessory 25 and are conected to an electronic control means for providing power to the infrared heating elements 27.

The supports 7 of the temperature sensor 1 are composed of a material with good thermal conductivity, e.g. copper, and preferably have a matte black coating in order to prevent reflection of the thermal radiation upward and to enable maximally uniform receipt of heat in the space above the weighing device 31.

Because the openings 15 in the supports 7 are directed towards the material being dried above the weighing pan 31, i.e. they are directed downward, there is no direct exposure of the temperature sensor 5 to radiation from the infrared heating elements 27, at the support 7. Thus, the current value of the temperature at the temperature sensor element 5 is a mean value representing the radiated heat from the infrared heating elements 27 absorbed from the support 7 and the heat absorbed from the space, the latter being namely the convection heat. Due to the good thermal conductivity of the support 7, a mean value of temperature results which is the average over the entire width of the space.

The temperature sensor 1 can be connected to an electronic control means which interrupts the power to the infrared heating elements when a predetermined maximum temperature is reached, and which reapplies said power when a predetermined minimum temperature is reached. The temperature sensor 1 may also alternatively be connected to an electronic temperature controller which controls the power supplied to (or output by) the infrared heating elements 27, according to a given program.

While a preferred embodiment has been shown and discussed, it will be understood that the present invention is not limited thereto, but may be otherwise embodied within the scope of the following claims.

What is claimed is:

1. A dryer comprising in combination:
   a precision weighing device having a weighing pan adapted to support items to be weighed;
   a plurality of infrared heating elements disposed above said weighing pan; and
   at least one temperature sensor for measuring the temperature above the items to be weighed, each said temperature sensor including a temperature sensing element mounted within a thermally conductive support member disposed below said heating elements, said temperature sensing element being resiliently urged by a resiliently deformable member firmly against a portion of said support member for thermal contact therewith, each said support member having a downwardly directed opening therein adjacent said temperature sensing element, whereby said support member shields said temperature sensing element from direct exposure to radiation from said heating elements;
   each said support member being disposed such that said opening therein is directed towards said weighing pan, whereby the temperature sensed by said temperature sensor is a mean value of the radiated heat from said heating elements absorbed by said support member and the convection heat absorbed from the space above the items to be weighed.

2. A dryer as claimed in claim 1, wherein each said support member is disposed horizontally parallel and in staggered relation to said infrared heating elements.

* * * * *